US008619045B2

(12) United States Patent
Yoshizawa (10) Patent No.: US 8,619,045 B2
(45) Date of Patent: Dec. 31, 2013

(54) CALCULATOR AND COMPUTER-READABLE MEDIUM

(75) Inventor: Hiroaki Yoshizawa, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 822 days.

(21) Appl. No.: 12/720,048

(22) Filed: Mar. 9, 2010

(65) Prior Publication Data

US 2010/0231597 A1    Sep. 16, 2010

(30) Foreign Application Priority Data

Mar. 12, 2009    (JP) ................ P2009-058907

(51) Int. Cl.
*G09G 5/00*    (2006.01)

(52) U.S. Cl.
USPC ........................................... 345/173; 382/189

(58) Field of Classification Search
USPC ............... 345/173; 178/18.01, 18.02, 18.03; 382/187, 188, 189; 715/268
See application file for complete search history.

(56) References Cited

U.S. PATENT DOCUMENTS

| 5,067,102 | A | | 11/1991 | Eisenstein | |
|---|---|---|---|---|---|
| 5,481,626 | A | * | 1/1996 | Matsubayashi | 382/189 |
| 5,544,260 | A | * | 8/1996 | Chefalas et al. | 382/187 |
| 5,724,457 | A | | 3/1998 | Fukushima | |
| 5,855,000 | A | * | 12/1998 | Waibel et al. | 704/235 |
| 6,754,386 | B1 | * | 6/2004 | Williamson et al. | 382/177 |
| 6,795,838 | B1 | * | 9/2004 | Kataoka | 708/160 |
| 7,181,068 | B2 | * | 2/2007 | Suzuki et al. | 382/229 |
| 7,447,360 | B2 | * | 11/2008 | Li et al. | 382/186 |
| 8,050,500 | B1 | * | 11/2011 | Batty et al. | 382/187 |
| 8,073,258 | B2 | * | 12/2011 | Yu et al. | 382/187 |
| 8,116,570 | B2 | * | 2/2012 | Vukosavljevic et al. | 382/187 |
| 8,285,049 | B2 | * | 10/2012 | Predovic et al. | 382/187 |
| 2002/0157880 | A1 | * | 10/2002 | Atwood et al. | 178/20.02 |
| 2003/0053084 | A1 | * | 3/2003 | Geidl et al. | 358/1.6 |
| 2005/0135678 | A1 | * | 6/2005 | Wecker et al. | 382/186 |

(Continued)

FOREIGN PATENT DOCUMENTS

| EP | 0440450 A2 | 8/1991 |
|---|---|---|
| EP | 1538549 A1 | 6/2005 |

(Continued)

OTHER PUBLICATIONS

Japanese Office Action dated Feb. 15, 2011 (and English translation thereof) in counterpart Japanese Application No. 2009-058907.
Extended European Search Report dated Jul. 30, 2010 (in English) issued in counterpart European Application No. 10154455.9.

*Primary Examiner* — Tom Sheng
(74) *Attorney, Agent, or Firm* — Holtz, Holtz, Goodman & Chick, PC (57) ABSTRACT

A calculator is provided. The calculator includes: a display unit having a touch panel; a recognition unit configured to: (i) recognize a numerical expression which is handwritten on the touch panel; (ii) convert the handwritten numerical expression in a text format; and (iii) display the text-converted numerical expression on the display unit; and an erasing unit configured to: if a part of the text-converted numerical expression is erroneously recognized and the erroneously-recognized part is specified, (i) erase the erroneously-recognized part and a part of the handwritten numerical expression corresponding to the erroneously recognized part. If information is handwritten again in the erased part of the handwritten numerical expression, the recognition unit recognizes the handwritten information again, and then the erroneously-recognized part of the text-converted numerical expression is corrected.

3 Claims, 8 Drawing Sheets

(56) References Cited

U.S. PATENT DOCUMENTS

2006/0062470 A1* 3/2006 Zhu et al. ............... 382/186
2008/0260240 A1* 10/2008 Vukosavljevic et al. ...... 382/159
2009/0304282 A1* 12/2009 Predovic et al. ............. 382/187
2009/0304283 A1* 12/2009 Predovic et al. ............. 382/189

FOREIGN PATENT DOCUMENTS

| JP | 7-334625 A | 12/1995 |
| JP | 9-231310 A | 9/1997 |
| JP | 2004-145408 A | 5/2004 |
| JP | 2007-72718 A | 3/2007 |

* cited by examiner

| FUNCTION | AUTOMATIC INPUT | CONDITION 1 | SELECTIVE INPUT | CONDITION 2 |
|---|---|---|---|---|
| INTEGRATION | - | - | dx, dy, dz | INTEGRAL SIGN |
| LIMIT | → | lim, VARIABLE | INFINITY, 0 | lim, VARIABLE |
| SUM | - | - | k = 1, n | $\Sigma$ |
| ... | ... | ... | ... | ... |

CALCULATOR AND COMPUTER-READABLE MEDIUM

The present application is based upon and claims priority from prior Japanese Patent Application No. 2009-058907, filed on Mar. 12, 2009, the entire content of which are incorporated herein by reference.

BACKGROUND

1. Technical Field

The present disclosure relates to a calculator and a computer-readable medium.

2. Related Art

Scientific calculators have been known as calculators performing calculations on various kinds of input numerical expressions and displaying the calculation result.

Recently, the kinds of functions that can be handled by scientific calculators have increased, and scientific calculators can perform complex calculations. However, in case of using such scientific calculators, in numerical expressions such as integration, an upper or lower limit or a numerical expression needs to be input through an input key group in predetermined order. For this reason, the input operation requires a labor intensive. From such a viewpoint, there has been known a technique of inputting a handwritten numerical expression, and recognizing the input numerical expression (see e.g., JP-A-2007-072718).

However, in case of recognizing the handwritten numerical expression, when a part of the handwritten numerical expression is erroneously recognized, the user again needs to handwrite the whole numerical expression. Thus, this input operation also becomes laborious. In the case of handwriting the numerical expression again, another part different from the erroneously-recognized part or the same part may be repeatedly erroneously recognized because of the handwriting input. In this case, the user needs to correct the erroneously-recognized part again, and requires more labor intensive. For this reason, a technique capable of easily correcting the handwritten numerical expression has been requested.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Accordingly, it is an illustrative aspect of the present invention to provide a calculator such as a scientific calculator capable of easily correcting a handwritten numerical expression.

According to one or more aspects of the present invention, there is provided a calculator. The calculator includes: a display unit having a touch panel; a recognition unit configured to: (i) recognize a numerical expression which is handwritten on the touch panel; (ii) convert the handwritten numerical expression in a text format; and (iii) display the text-converted numerical expression on the display unit; and an erasing unit configured to: if a part of the text-converted numerical expression is erroneously recognized and the erroneously-recognized part is specified, (i) erase the erroneously-recognized part and a part of the handwritten numerical expression corresponding to the erroneously recognized part. If information is handwritten again in the erased part of the handwritten numerical expression, the recognition unit recognizes the handwritten information again, and then the erroneously-recognized part of the text-converted numerical expression is corrected.

According to one or more aspects of the present invention, there is provided a computer readable medium storing a program for causing the computer to perform operations comprising: (a) recognizing a numerical expression which is handwritten on a touch panel; (b) converting the handwritten numerical expression in a text format; (c) displaying the text-converted numerical expression on a display unit; if a part of the text-converted numerical expression is erroneously recognized, (d) erasing the erroneously-recognized part and a part of the handwritten numerical expression corresponding to the erroneously recognized part; (e) recognizing information which is handwritten again in the erased part of the handwritten numerical expression; and (h) correcting the erroneously-recognized part of the text-converted numerical expression.

According to one or more aspects of the present invention, there is provided a calculator. The calculator includes: a display unit having a touch panel; and a processor which performs operation comprising: (a) recognizing a numerical expression which is handwritten on a touch panel; (b) converting the handwritten numerical expression in a text format; (c) displaying the text-converted numerical expression on a display unit; if a part of the text-converted numerical expression is erroneously recognized, (d) erasing the erroneously-recognized part and a part of the handwritten numerical expression corresponding to the erroneously recognized part; (e) recognizing information which is handwritten again in the erased part of the handwritten numerical expression; and (f) correcting the erroneously-recognized part of the text-converted numerical expression.

Other aspects of the invention will be apparent from the following description, the drawings and the claims.

DETAILED DESCRIPTION OF EXEMPLARY EMBODIMENTS

Hereinafter, Exemplary embodiments of the present invention will be described in detail with reference to the accompanying drawings. However, the scope of the present invention is not limited to the exemplary embodiments.

Figure 1:
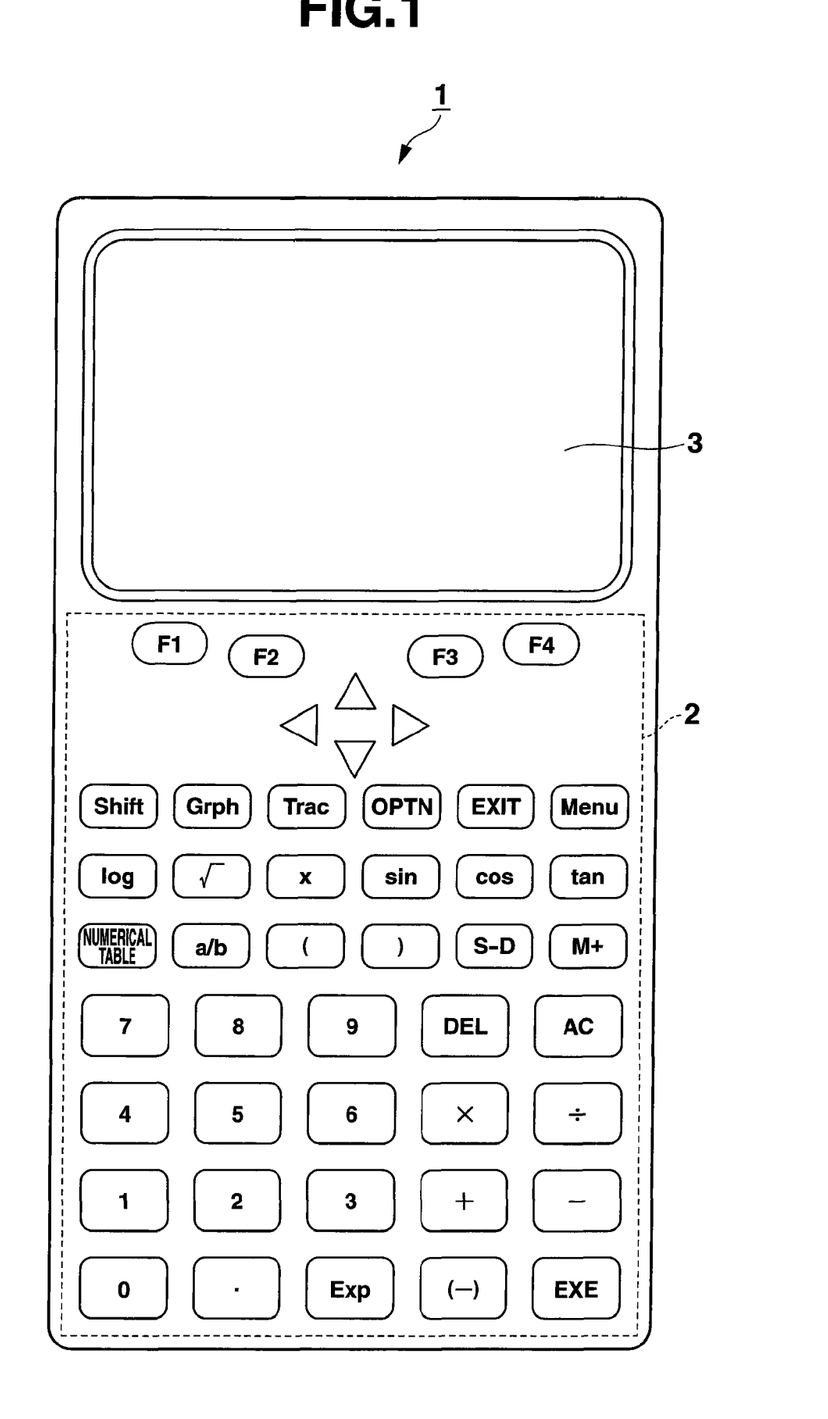
FIG. 1 is a diagram illustrating a schematic configuration of a scientific calculator according to an embodiment of the invention.

An exemplary embodiment of the present invention will be described with reference to FIGS. 1 to 4C. First, referring to FIG. 1, a schematic diagram of a scientific calculator 1 according to the invention will be described. As shown in FIG. 1, the scientific calculator 1 includes an input key group 2 having various key groups and a display 3.

The input key group 2 is a key group for receiving input operations of elements constituting numerical expression such as numerical values and operation signs or receiving instruction operations of various processes from the user, and includes a plurality of keys to which specific functions are assigned.

The display 3 may be configured by a Liquid Crystal Display (LCD), an Electronic Luminescent Display (ELD), or the like. Specifically, the display 3 is configured to display various data necessary to use the scientific calculator 1, in addition to characters, signs, numerical expressions, calculation results according to the operation of an input pen (not shown) or the input key group 2. The display 3 is integrally provided with a touch panel 15A (see FIG. 2) on the whole display screen.

Figure 2:
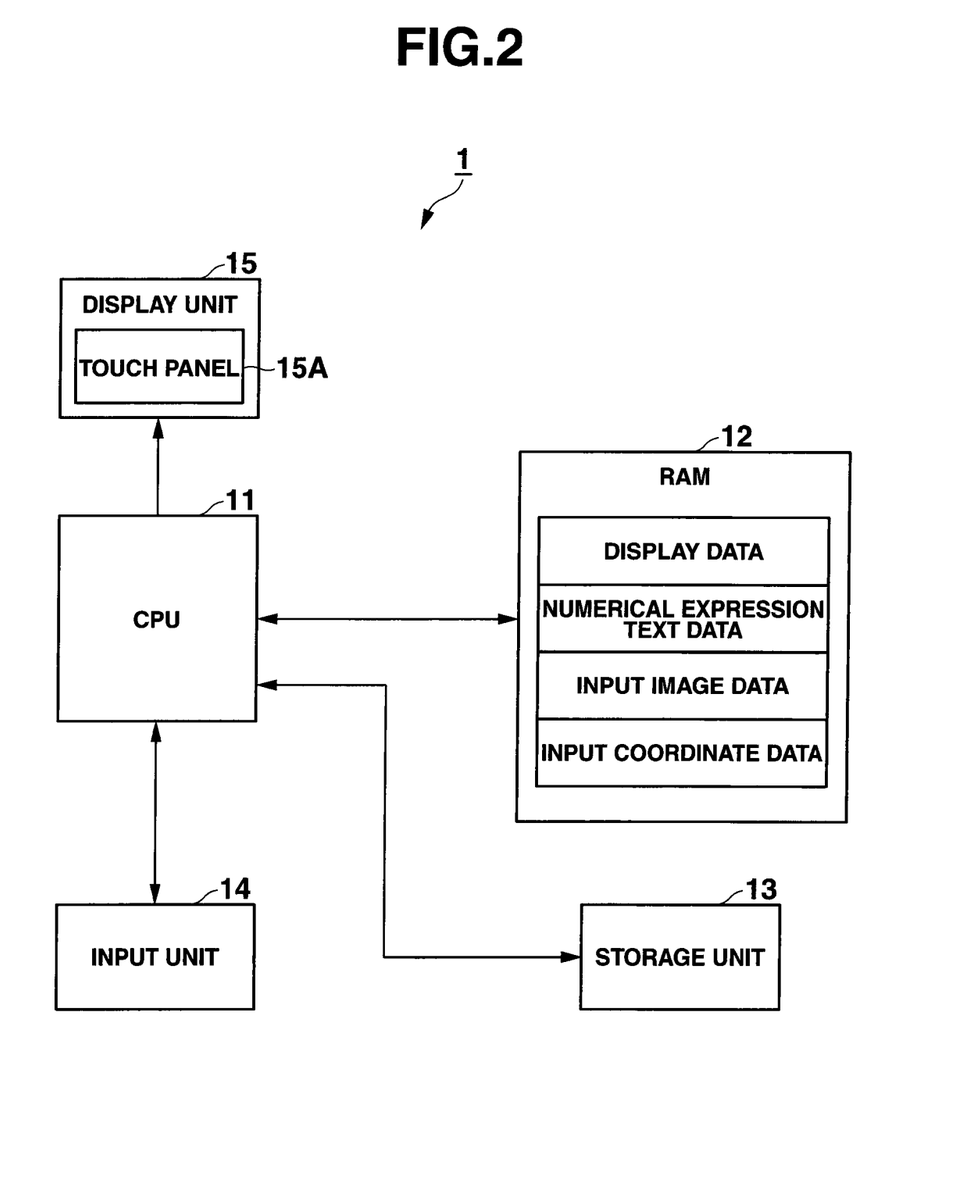
FIG. 2 is a diagram illustrating an internal configuration of the scientific calculator according to the exemplary embodiment.

Next, referring to FIG. 2, an internal configuration of the scientific calculator 1 will be described. The scientific calculator 1 includes: a Central Processing Unit (CPU) 11 serving as a recognition section, an erasing section, an automatic input section, an input candidate display section, and a candidate input section; a Random Access Memory (RAM) 12; a storage unit 13; an input unit 14; and a display unit 15 serving as a display section.

The CPU 11 centrally controls respective units of the scientific calculator 1. Specifically, the CPU 11 expands a program, which is specified by a system program and various application programs stored in the storage unit 13, onto the RAM 12, and then executes various programs in cooperation with the program expanded onto the RAM 12.

Specifically, in cooperation with a handwriting input program, the CPU 11 recognizes a numerical expression (handwriting numerical expression 41B) input to the input unit 14 through pen-touch input, converts the recognized numerical expression into text, and displays the text-converted numerical expression on the display unit 15. When the user specifies an erroneously-recognized part (erroneously-recognized text part 41C) of the text-converted numerical expression using the touch-pen, the CPU 11 erases the erroneously-recognized part (the text part 41C) and an erroneously-recognized handwriting input part (erroneously-recognized handwritten part 41D) corresponding to the erroneously recognized part. For example, when "d" is input again to the erased part (handwritten part 41D) of handwriting numerical expression using the touch-pen, the CPU 11 recognizes the "d" again and corrects the text-converted numerical expression.

The RAM 12 is a volatile memory for temporarily storing information, and has a plurality of work areas for storing various execution programs and data related to the various programs. Specifically, display data, numerical expression text data, input image data, and input coordinate data are stored in the RAM 12, respectively.

The display data are displayed on the display unit 15. The numerical expression text data display the recognized numerical expression in a text format. The input image data represent coordinate rows of data input to the touch panel 15A through pen-touch input (handwriting input). The input coordinate data represent coordinate positions input through pen-touch input (i.e., coordinate positions at the time of pen-touch input).

The storage unit 13 may be a nonvolatile memory configured by a Read Only Memory (ROM) or the like. The store unit 13 stores various programs and various data. Specifically, handwriting input programs are stored in the storage unit 13.

The input unit 14 is provided with the input key group 2, and outputs operation signals corresponding to pressed keys to the CPU 11.

The display unit 15 is provided with the display 3, performs screen display in response to display signals from the CPU 11. The display unit 15 is configured integrally with the touch panel 15A serving as an input section and a candidate specification input section.

The touch panel 15A detects a contact position of an input pen (not shown) coming into contact with the display screen (display screen of display 3), and outputs information about the contact position to the CPU 11. Specifically, the touch panel 15A is provided, for example, on the display screen or inside the display screen, detects XY coordinates of the contact position on the display screen by methods such as an electromagnetic induction method, a magnetic distortion method, and a pressure sensing method, and then outputs information about the XY coordinates to the CPU 11.

Next, an operation of the scientific calculator 1 will be described.

Figure 3:
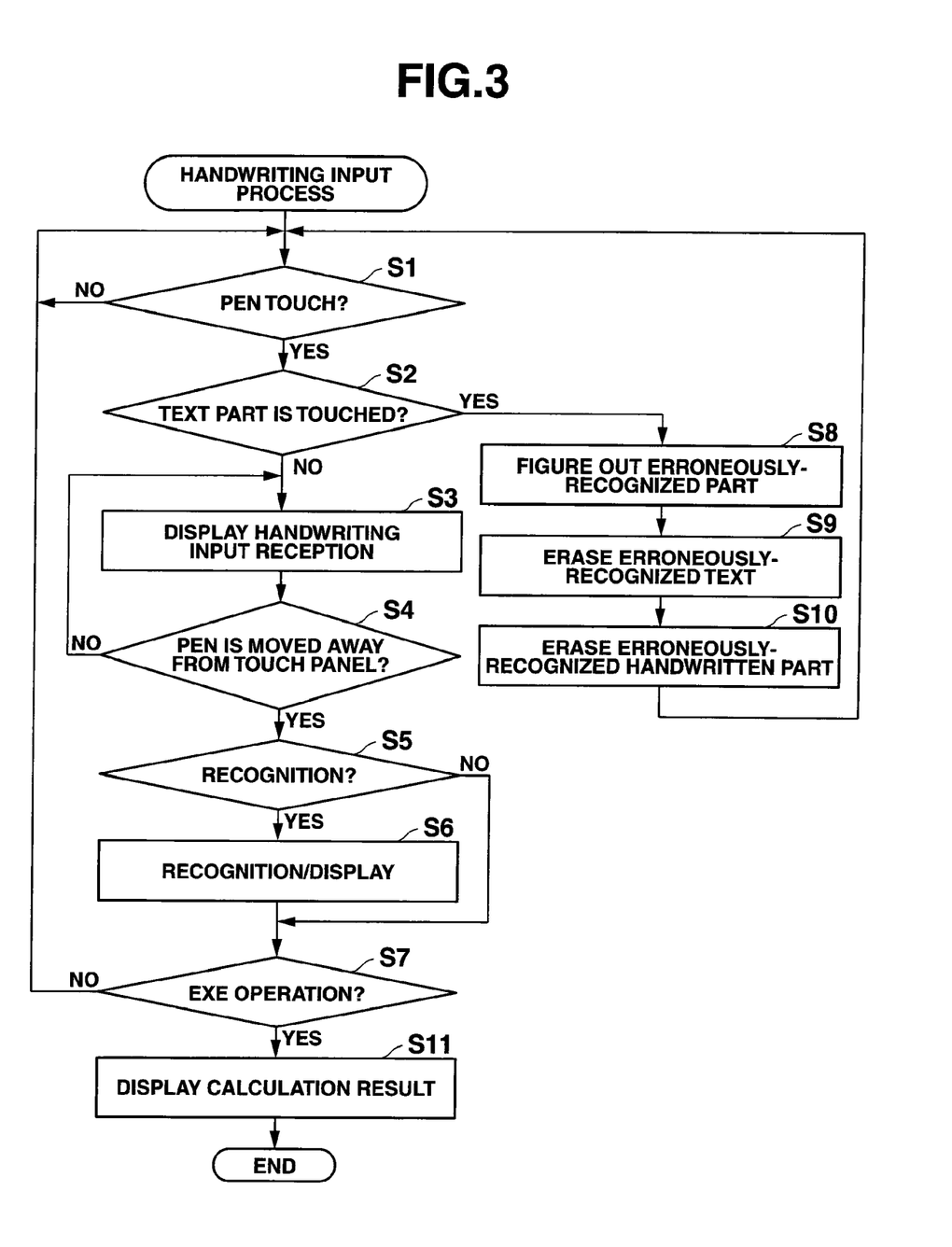
FIG. 3 is a flowchart illustrating the flow of a handwriting input process.

Referring to FIG. 3, a handwriting input process performed by the scientific calculator 1 will be described. In the handwriting input process, a numerical expression handwritten by the user is converted into text data by character/sign recognition. When there is an erroneously-recognized part in the text-converted numerical expression, the erroneously-recognized part is erased according to the user's specification. Then, handwritten information re-input to the erased erroneously-recognized part is recognized again. Thus, it is possible to correct the numerical expression.

In the scientific calculator 1, for example, when the user's execution instruction of the handwriting input process is input using touch pen (not shown) or by an operation of the input unit 14, the handwriting input process is performed in cooperation between the CPU 11 and the handwriting input programs which are read from the storage unit 13 and expanded onto the RAM 12.

Hereinafter, an operation in case of inputting a numerical expression displayed on a display screen 41 shown in FIG. 4A by pen-touch will be described. At the time of start of the process, it is considered that a numerical expression has not been input by pen-touch and nothing has been displayed on the display screen 41.

First, it is determined whether or not there is a pen-touch input (Step S1). Specifically, this determination step is performed based on whether or not the CPU 11 receives a signal representing the pen-touch input. In this case, the signal representing the pen-touch input corresponds to a signal (input coordinate data signal) of input coordinate data representing a coordinate position of the pen-touch input. For example, when pen-touch input is performed on the touch panel 15A using an input pen (not shown) by the user, the input coordinate data signal is output from the touch panel 15A to the CPU 11. When the CPU 11 receives the input coordinate data signal, it is determined that the pen touch is input (Step S1: Yes). In this case, the input coordinate data signal is continuously output from the touch panel 15A and the input coordinate data signal is continuously read by the CPU 11, until the input pen is moved away from the touch panel 15A.

In Step S1, when it is determined that no pen touch is input (Step S1: No), the process goes to Step S1. In Step S1, when it is determined that a pen touch is input (Step S1: Yes), it is determined whether or not a text part is touched (Step S2).

When a pen-touch input (input of integral sign "∫") is started using the input pen by the user in a state where nothing is displayed on the display screen 41, the pen touch is detected (Step S1: Yes). Since the first contact is not in the text part (Step S2: No), handwriting input is received and displayed (Step S3).

Specifically, in the process of the handwriting input reception/display, the input coordinate data output from the touch panel 15A are received (handwriting-input reception) by the CPU 11, the received input coordinate data are stored in the RAM 12, and image data corresponding to the input coordinate data are generated and displayed as trace of the pen on the display unit 15.

After Step S3, it is determined whether or not the pen is moved away from the touch panel 15A (Step S4). Specifically, this determination step is performed based on whether or not the CPU 11 receives the input coordinate data signal. For example, when the pen-touch input of "∫" shown in FIG. 4A is completed and the input pen is moved away from the touch panel 15A, the input coordinate data signal is not output from the touch panel 15A and thus it is determined that the pen is moved away from the CPU 11.

In Step S4, when it is determined that the pen is not moved away from the touch panel 15A (Step S4: No), the process goes to Step S3. Accordingly, the trace corresponding to the handwriting input is displayed while the handwriting is input by the pen. In Step S4, when it is determined that the pen is moved away from the touch panel 15A (Step S4: Yes), it is determined whether or not the handwriting can be recognized based on the handwriting data (Step S5). Specifically, in this step, it is determined whether or not the process goes to the recognition process based on whether or not a certain time has elapsed since the pen is moved away from the touch panel 15A. That is, in an input operation of a character configured by plural strokes, it is necessary to prevent the recognition process from starting because the pen is moved away from the touch panel 15A every the respective strokes of the character. Thus, this determination step is performed based on whether or not the given time has elapsed. It is assumed that the given time is set by the user in advance and is stored in the storage unit 13 or the like.

In Step S5, when it is determined that the handwriting can be recognized (Step S5: Yes), a recognition/display process of Step S6 is performed. When the handwriting cannot be recognized (Step S5: No), the process returns to Step S1 thorough Step S7, and waits for the next pen input.

Next, the recognition/display process of Step S6 will be described. The integral sign "∫" is handwritten, then the pen is moved away from the touch panel 15A (Step S4: Yes) and then a given time has elapsed until the next pen input is performed. In this case, the recognition process can be performed (Step S5: Yes) and the input "∫" is recognized as an integral sign. The recognized integral sign "∫" is displayed on the left of the screen in a text format.

Figure 4A:
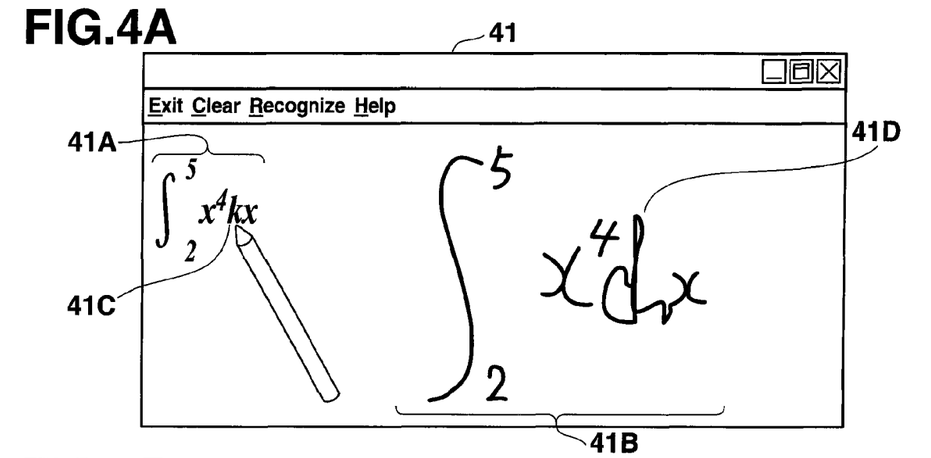
FIG. 4A is a diagram illustrating a display screen displaying a text-converted numerical expression and a recognized numerical expression.

Then, the same processes are repeatedly performed in Step S1 to Step S7, the pen-touch input 41B of the numerical expression shown in FIG. 4A is completed, and the text-converted numerical expression 41A is displayed. At this time, it is assumed that the handwriting "d" is erroneously recognized as "k" and the erroneously-recognized "k" is displayed in the erroneously-recognized text part 41C of the text-converted numerical expression 41A. In this case, when the user determines the erroneous recognition with reference to the text-converted numerical expression 41A, the user performs a specification input (pen-touch input) of the text part 41C. It is determined that the text part is touched through the pen-touch input (Step S2: Yes)

In Step S2, when it is determined as YES, the erroneously-recognized part is figured out (Step S8). Specifically, the text data corresponding to the erroneously-recognized part is selected from the pen-touch input coordinate (coordinate of the text part 41C) in Step S2.

After Step S8, the erroneously recognized text is erased (Step S9). In this case, the text character "k" of the erroneously recognized text part 41C is erased.

After Step S9, the erroneously-recognized handwritten part is erased (Step S10). In this case, the erroneously-recognized handwritten part 41D corresponding to the text part 41C is erased. After Step S10, the process goes to Step S1 and waits for a new pen input.

Figure 4B:
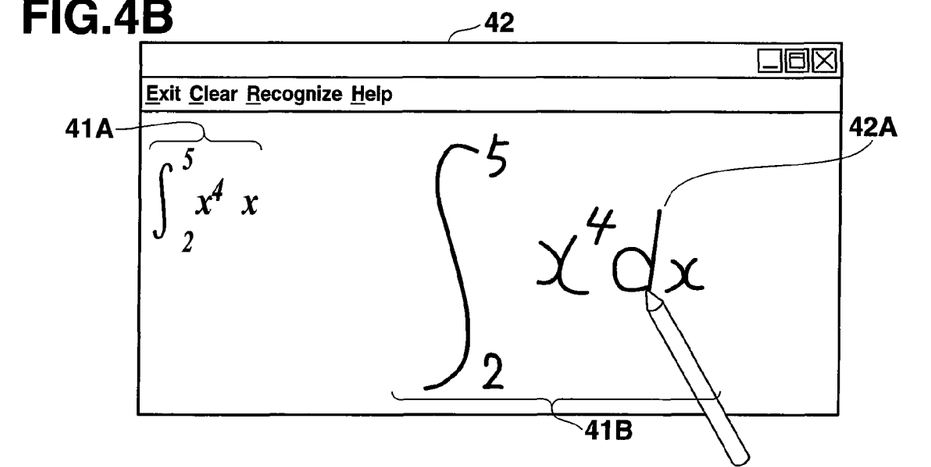
FIG. 4B is a diagram illustrating the display screen in which handwritten information "d" is input again.
Figure 4C:
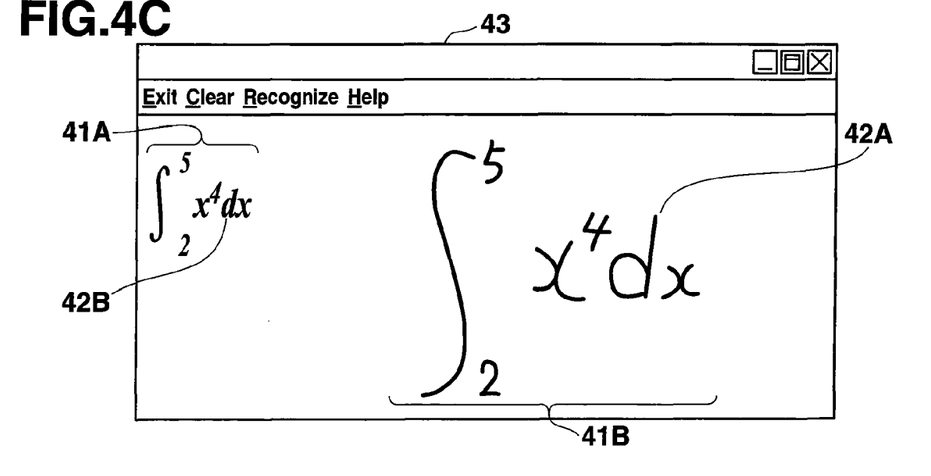
FIG. 4C is a diagram illustrating the display screen in which a numerical expression corrected by text-converted "d" is displayed.

When "d" is newly input to the erased part by the pen touch, the handwriting input "d" 42A is displayed as shown in FIG. 4B (Steps S1 to S3). Then, the handwriting input "d" is recognized. As shown in FIG. 4C, the numerical expression 41A corrected by the text-converted "d" 42B is displayed on the display screen 43.

In Step S7, when the user's operation (EXE operation) of an EXE key of the input unit 14 is detected, the text-converted numerical expression 41A is calculated and the calculation result is displayed (Step S11). After Step S11, the handwriting input process is ended.

As described above, according to the exemplary embodiment, the scientific calculator 1 erases the text part 41C input by pen-touch and the handwritten part 41D when the text part 41C of the numerical expression 41A is specified by pen-touch input. The scientific calculator 1 recognizes the "d" 42A and corrects the text-converted numerical expression 41A when the "d" 42A is handwritten again to the erased part (the handwritten part 41D) of the handwritten numerical expression. For this reason, even when the numerical expression input by pen-touch is erroneously recognized, the erroneously recognized part can be corrected only by specifying the erroneously recognized text part 41C and then inputting the "d" again. Thus, the scientific calculator 1 can recognize the numerical expression. Accordingly, the user does not have to handwrite the whole numerical expression and can easily correct the handwritten input numerical expression.

[Modified Example of Exemplary Embodiment]

Referring to FIG. 5 to FIG. 8, a modified example of the exemplary embodiment according to the present invention will be now described. A configuration of a scientific calculator according to the modified example is the same as the configuration of the scientific calculator 1 according to the above-mentioned embodiment. In the modified example, the same reference numerals are given to the same parts as those of the above-mentioned embodiment, and the detailed description is incorporated herein.

In the modified example, a modified example of Step S6 (recognition/display process) of the handwriting input process will be now described.

Figure 5:
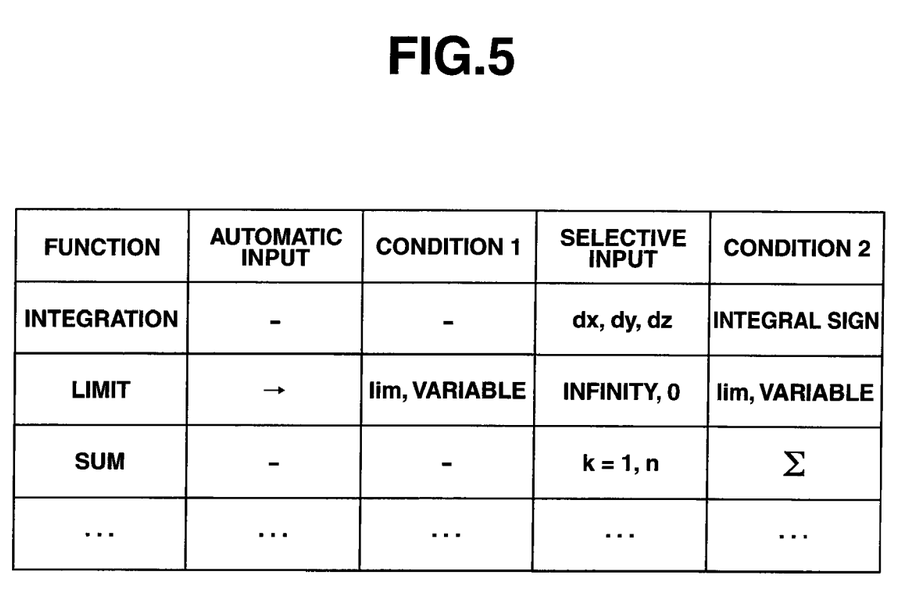
FIG. 5 is a diagram illustrating a function list.

First, referring to FIG. 5, a function list 13A used in the recognition/display process of the modified example will be described. The function list 13A is stored in the storage unit 13. As shown in FIG. 5, the function list 13A has functions, automatic inputs (candidates), conditions 1, selective inputs (candidates), and conditions 2. The respective items are stored in association with each other.

The functions are data representing functions used in the numerical expression. The automatic inputs (candidates) are data representing candidates of items necessary for functions used in the numerical expression. As the automatic input candidates, for example item "→" is stored. The conditions 1 are data representing conditions for automatically inputting the automatic input candidates into the numerical expression. As the conditions 1, for example, functions (e.g., "lim" function) and variables (e.g., variable such as "x") used in the numerical expression are stored.

The selective inputs (candidates) are data representing candidates applied to the functions used in the numerical expression. As the selective input candidates, for example, "dx, dy, dz" are stored. The conditions 2 are data representing conditions for displaying the selective input candidates on the display unit 15. As the conditions 2, for example, functions (e.g., integral sign) used in the numerical expression are stored.

Figure 6:
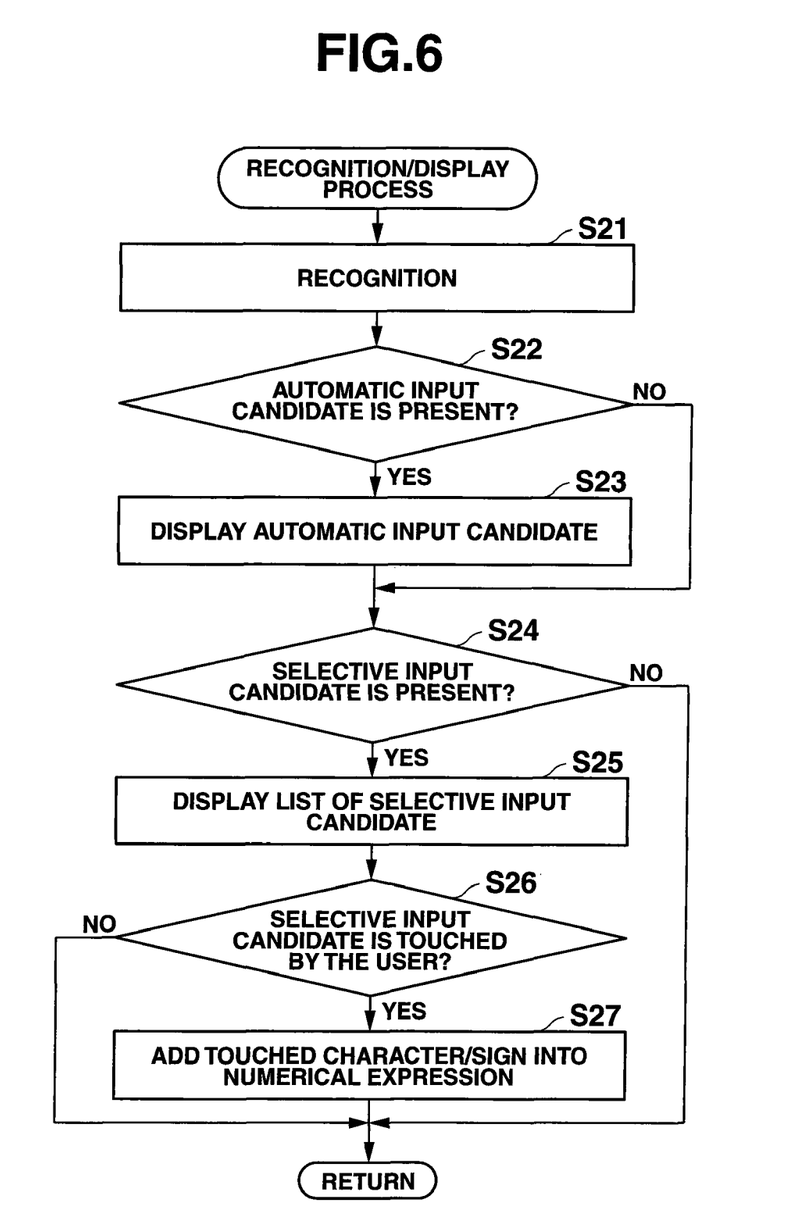
FIG. 6 is a flowchart illustrating flow of a recognition/display process.

Next, referring to FIG. 6, a recognition/display process according to the modified example will be described. The recognition/display process is used instead of Step S6 shown in FIG. 3. In the recognition/display process, the item (automatic input candidate) necessary for the function is automatically input to the numerical expression input by pen touch. The candidates (selective input candidates) applied to the function are displayed, and the candidate specified in the displayed candidates is input to the numerical expression using touch pen.

In the modified example, it is assumed that Steps S1 to S7 of the handwriting input process shown in FIG. 3 are repeatedly performed, and the numerical expression shown in FIGS. 7A to 7C or FIG. 8 is already input. In this case, the recognition/display process will be described hereinafter.

First, when the pen is moved away from the touch panel 15A while the numerical expression is handwritten, it is determined that the recognition can be performed (Step S5: Yes). Thus, the recognition is performed (Step 21). In this step, the same process as the recognition process in Step S6 is performed.

After Step S21, it is determined whether or not an automatic input candidate is present (Step S22). Specifically, it is determined whether or not the condition 1 coinciding with the information input by pen-touch is present with reference to the function list 13A stored in the storage unit 13. Thereby, it is determined whether or not the automatic input candidate is present (whether or not it is stored in the function list 13A).

Figure 8:
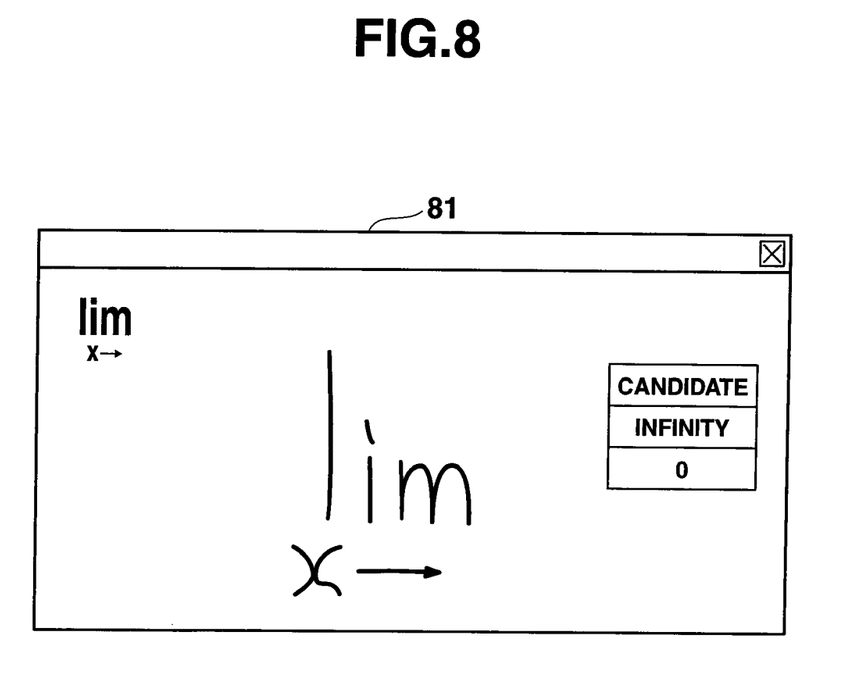
FIG. 8 is a diagram illustrating the display screen in which automatic selective input candidates are automatically added to a numerical expression and also the selective input candidate is displayed.

In Step S22, when it is determined that there is no automatic input candidate (Step S22: No), the process goes to Step S24. In Step S22, when it is determined that there is the automatic input candidate (Step S22: Yes), the automatic input candidate is displayed (Step S23). Specifically, the automatic input candidate is automatically input to the numerical expression, and then the automatic input candidate is displayed on the display unit 15. For example, as shown in FIG. 8, the items "lim" and "x" are handwritten on the touch panel 15A using the input pen by the user. When the handwriting input function is recognized as a limit function ("lim" function) in Step S21, it is associated with the conditions 1 ("lim" and variable) in the function list 13A and "→" is stored as the automatic input candidate. Accordingly, the automatic input candidate "→" is automatically input and displayed onto the handwritten numerical expression as well as the text-converted numerical expression.

Next, it is determined whether or not a selective input candidate is present (Step S24). Specifically, it is determined whether or not the condition 2 coinciding with the information input by pen touch is present with reference to the function list 13A stored in the storage unit 13. Thereby, it is determined whether or not the selective input candidates are present (whether or not they are stored in the function list 13A).

In Step S24, when it is determined that there is no selective input candidate (Step S24: No), the process goes to Step S7 of the handwriting input process. In Step S24, when it is determined that there are selective input candidates (Step S24: Yes), the selective input candidates are displayed as a list (Step S25). Accordingly, in FIG. 8, the selective input candidates "infinity" and "0" are stored in association with the conditions 2 ("lim", variable) in the function list 13A. Therefore, as shown on the display screen 81 in FIG. 8, the selective input candidates "infinity" and "0" are displayed on the display unit 15 separately from the automatic input candidates.

Figure 7A:
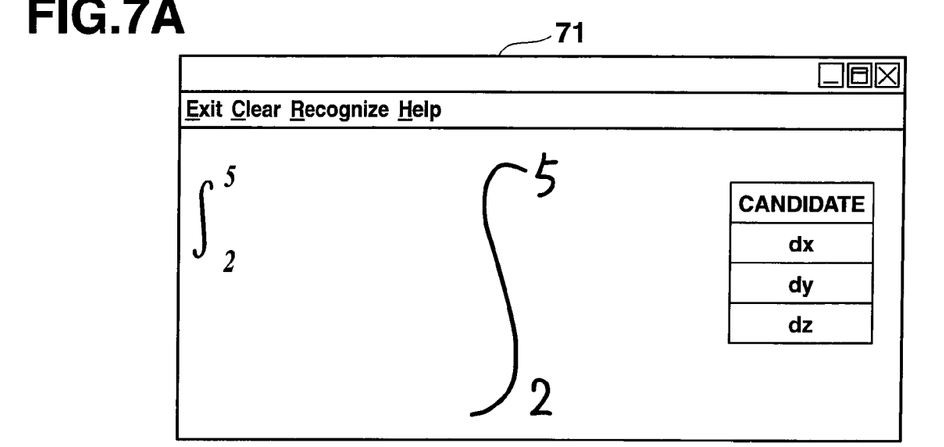
FIGS. 7A and 7B are diagrams illustrating the display screen in which selective input candidates are displayed.
Figure 7B:
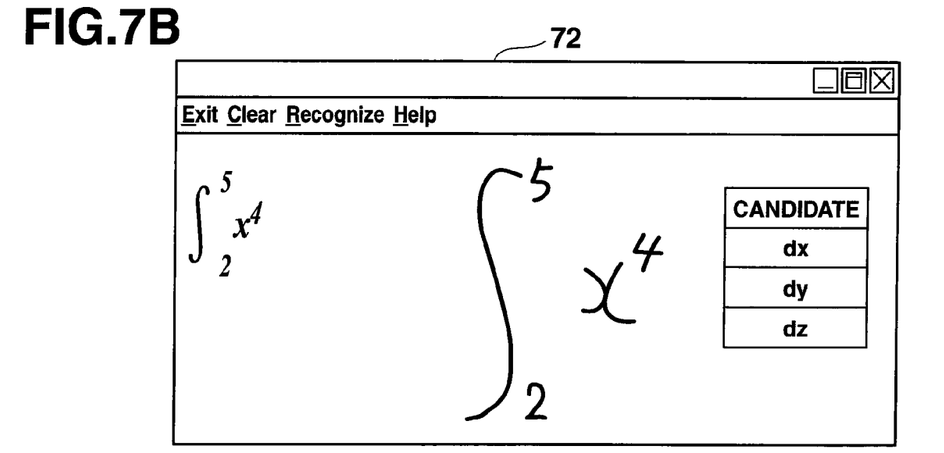
Figure 7C:
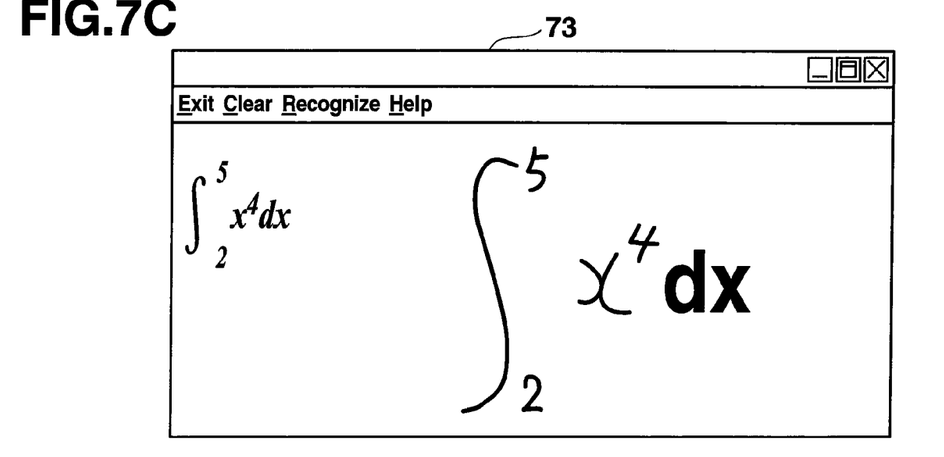
FIG. 7C is a diagram illustrating the display screen in which a selective input candidate "dx", which is specified by the user, is automatically added to the numerical expression, and also added into the text-converted numerical expression.

Meanwhile, as shown in FIG. 7A, when the integral sign "∫" and the integral ranges "5" and "2" are handwritten on the touch panel 15A using the input pen by the user, the handwritten numerical expression is recognized as an integral function in Step S21. Also, the selective input candidates "dx, dy, dz" are stored association with the conditions 2 (integral sign) in the function list 13A. Accordingly, in this case, the selective input candidates "dx", "dy", and "dz" are displayed on the display unit 15 as shown on the display screen 71 in FIG. 7A (Step S25).

After Step S25, it is determined whether or not the selective input candidate is touched by the user (Step S26). Specifically, one selective input candidate of the selective input candidates is touched (specified by the user) on the touch panel 15A using the input pen, this determination step is performed based on whether or not the CPU 11 receives a signal representing the user's specification.

In Step S26, when it is determined that the selective input candidate is touched (Step S26: Yes), the character/sign of the selective input candidate is added to the numerical expression (Step S27). For example, after the selective input candidates are displayed as shown in FIG. 7A, the numerical expression is further input in the display screen 72 shown in FIG. 7B. In this state, when the candidate "dx" of the selective input candidates is touched (specified by the user), the selective input candidate "dx" is automatically added to the numerical expression and displayed on the display screen 73 in FIG. 7C. In addition, the candidate "dx" is added to the text-converted numerical expression and displayed on the display screen 73. After Step S27, the process goes to Step S7 of the handwriting input process.

Meanwhile, in FIG. 8, "infinity" or "0" is touched (specified by the user), so that the selected candidate is added to the rear part of "x→".

As described above, according to the modified example, when the numerical expression, which is in the middle of handwriting input (pen-touch input), is recognized as a certain function, the item (e.g., in case of "lim" function, an item "→" is necessary for the "lim" function) necessary for the recognized function is automatically added to the numerical expression. For this reason, the user can add the item "→" necessary for the "lim" function without using touch pen, and it is possible to reduce time and effort for handwriting the numerical expression.

When the numerical expression input by pen touch is recognized as a given function, the input candidates for the recognized function is displayed on the display unit 15. For example, in the case of an integral function, the candidates "dx, dy, dz" for the integral function is displayed on the display unit 15. For this reason, the displayed candidates is not required to be handwritten with reference to the displayed candidates (dx, dy, and dz), and thus it is possible to reduce time and effort for handwriting the numerical expression.

When one candidate is specified in the displayed candidates by pen-touch, the specified candidate is automatically added to the numerical expression. For this reason, the user can add the candidate ("dx") only by specifying the desired candidate (e.g., "dx") from the displayed candidates without using the pen touch, and thus it is possible to reduce time and effort for handwriting the numerical expression.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

For example, a program for causing a computer to execute the operations of the exemplary embodiment may be installed in an electronic apparatus including a display unit with a touch panel. Thus, the present invention may be realized by the electronic apparatus such as a computer.

Furthermore, a computer readable-medium may be used which stores a program for causing a computer to execute the operations of the exemplary embodiment.

What is claimed is:

1. A calculator comprising:
   a display unit having a touch panel;
   a recognition unit configured to (i) recognize a numerical expression which is handwritten on the touch panel, (ii) convert the handwritten numerical expression in a text format, and (iii) display the text-converted numerical expression on the display unit;
   an automatic input unit configured to, if the recognition unit recognizes the handwritten numerical expression as a certain function, add an item for the certain function into the handwritten numerical expression and the text-converted numerical expression; and
   an erasing unit configured to, if a part of the text-converted numerical expression is erroneously recognized and the erroneously-recognized part is specified, erase the erroneously-recognized part and a part of the handwritten numerical expression corresponding to the erroneously recognized part,
   wherein if information is handwritten again in the erased part of the handwritten numerical expression, the recognition unit recognizes the handwritten information again, and then the erroneously-recognized part of the text-converted numerical expression is corrected.

2. A non-transitory computer readable storage medium having a program stored thereon for controlling a computer to perform operations comprising:
   recognizing a numerical expression which is handwritten on a touch panel;
   converting the handwritten numerical expression in a text format;
   displaying the text-converted numerical expression on a display unit;
   if the handwritten numerical expression is recognized as a certain function, adding an item for the certain function into the handwritten numerical expression and the text-converted numerical expression;
   if a part of the text-converted numerical expression is erroneously recognized and the erroneously-recognized part is specified, erasing the erroneously-recognized part and a part of the handwritten numerical expression corresponding to the erroneously recognized part;
   recognizing information which is handwritten again in the erased part of the handwritten numerical expression; and
   correcting the erroneously-recognized part of the text-converted numerical expression.

3. A calculator comprising:
   a display unit having a touch panel; and
   a processor which performs operations comprising:
   recognizing a numerical expression which is handwritten on a touch panel;
   converting the handwritten numerical expression in a text format;
   displaying the text-converted numerical expression on a display unit;
   if the handwritten numerical expression is recognized as a certain function, adding an item for the certain function into the handwritten numerical expression and the text-converted numerical expression;
   if a part of the text-converted numerical expression is erroneously recognized and the erroneously-recognized part is specified, erasing the erroneously-recognized part and a part of the handwritten numerical expression corresponding to the erroneously recognized part;
   recognizing information which is handwritten again in the erased part of the handwritten numerical expression; and
   correcting the erroneously-recognized part of the text-converted numerical expression.

* * * * *